३,४४९,४६५
POLYESTER-POYLSILOXANE RESINS GIVING COATINGS OF INCREASED GLOSS RETENTION AND COLOR STABILITY
Dietrich Gölitz, Cologne-Stammheim, Walter Noll, Opladen, Klaus Damm, Cologne-Flittard, and Walter Krauss, Cologne-Stammheim, Germany, assignors to Farbenfabriken Bayer Aktiengesellschaft, Leverkusen, Germany, a corporation of Germany
No Drawing. Filed Feb. 23, 1966, Ser. No. 529,203
Claims priority, application Germany, Mar. 17, 1965, F 45,545
Int. Cl. C08g 31/06; C09d 3/82
U.S. Cl. 260—824                                    3 Claims

ABSTRACT OF THE DISCLOSURE

A baking enamel lacquer comprising a polyester-polysiloxane co-condensate, wherein the polyester is a copolymer of 25 to 35 mol percent terephthalic or isophthalic acid, 10 to 20 mol percent trimethylol propane, and 45 to 60 mol percent ethylene glycol, and 3 to 5 times the weight of said polyester of a polysiloxane which is a co-polymer of the hydrolysis product of a solution of 55 to 65 mol percent phenyl trichlorosilane, 35 to 45 dimethyl dichlorosilane, and 5 to 10 mol percent trimethyl chlorosilane.

---

The present invention is concerned with baking enamel lacquers made from polyester siloxanes, which yield coatings of good thermal stability and, at the same time, of improved gloss retention and fastness to yellowing.

Resins obtained by combining phenylmethyl polysiloxanes with polyesters of aromatic dicarboxylic acids and polyhydric alcohols are known and are characterized by good coating properties, chiefly with regard to their pigment absorption and to the elasticity, surface hardness and resistance to chemicals of the coats produced therefrom by baking. However, their behaviour in long-continuing heat can no longer satisfy the very high demands made today on the decorative effect of such coatings, particularly with regard to glass retention and yellowing. Among the great number of possible variations of the method of production and the composition of polyester siloxane resins, we have now found a combination which, by analogous application of known reaction methods, leads to paint resins with which the desired improvement of gloss and colour can be achieved without losing any of the other advantages.

Thus, according to the present invention, there are provided baking enamel lacquers of improved gloss retention, fastness to yellowing and thermal stability, comprising polyester-siloxane co-condensates which are produced in that a polyester which contains 8 to 20 molar percent hydroxyl groups and has been obtained from 25 to 35 molar percent terephthalic or isophalic acid ester, 10 to 20 molar percent trimethylol propane and 45 to 60 molar percent ethylene glycol by transesterification at an elevated temperature, is heated with three to five times the amount by weight of an organo-polysiloxane obtained by hydrolyzing a solution of 55 to 65 molar percent phenyl trichlorosilane, 35 to 45 molar percent dimethyl dichlorosilane and 5 to 10 molar percent trimethyl chlorosilane with water in an inert solvent absorbing no substantial amounts of water, at temperatures between 140 and 230° C. until a viscosity between 250 and 5000 cst. at 175° C. is reached these co-condensates being diluted with organic solvents and mixed with heat resistant pigments, with the addition of hardening agents if desired.

A particularly noteworthy feature of the combination according to the present invention is constituted by the trimethyl siloxane units in the organo-polysiloxane component of the co-condensate and the absence of diphenyl siloxane units. According to generally known experience, the latter should improve the thermal stability, whereas the increase of silicon-bound methyl radicals should increase the sensitivity to heat. As is shown in the comparative experiments described below, a polysiloxane component composed only of monophenyl-siloxane and dimethyl-siloxane units gives rise to resin coatings of good gloss retention but unsatisfactory thermal stability. The concurrent use of a sufficient proportion of diphenyl-siloxane admittedly results in elastic coatings of very good thermal stability but the glass of these coatings rapidly deteriorates at elevated temperatures. If, however, a resin containing trimethyl siloxane units is used instead, the advantages of the two aforesaid combinations, viz. the gloss retention of that poorer in phenyl and the general stability of that richer in phenyl are, surprisingly, attained at the same time.

The method of hydrolysis by which the siloxane resin component has been prepared is also important. To ensure the homogeneity of polyester siloxane resins, it was previously found advantageous to hydrolyze the organo-chlorosilanes with the aid of alcohols, either by using water in the presence of, for example, butanol (and butyl acetate), or by first producing, for example, with ethanol and without water, a solution of alkoxysilanes which were then reacted with water to form polysiloxanes. For the combination according to the present invention, it has proved to be more advantageous to use products which have been prepared by carrying out the chlorosilane hydrolysis directly with water and without a possibility of forming alkoxy-silyl groups. An organo-polysiloxane produced in the following known manner has proved very suitable: the organo-chlorosilanes to be hydrolyzed are dissolved in a solvent which absorbs not more than unimportant amounts of water and is inert to chlorosilanes, for example, an aromatic hydrocarbon. The resultant solution and a quantity of water amounting to at least four times the weight of the hydrogen chloride which can hydrolytically by split off from the dissolved chlorosilanes, are allowed to run together under vigorous stirring at a sufficiently slow rate for the temperature of the mixture not to rise above 50° C. After separation of the aqueous phase, there remains an organo-polysiloxane solution which can normally be used without further treatment; a small content of acid is washed out with water, if necessary. The organo-polysiloxanes thus obtained still contain residual silicon-bound hydroxyl groups originating from the hydrolysis, as do the organo-polysiloxanes prepared by the methods previously described.

The polyester components of the baking enamels according to the present invention are prepared in known manner, for example, by the transesterification of benzene-dicarboxylic acid methyl esters with polyhydric alcohols in the presence of catalytic amounts of barium stearate, while distilling off the methanol formed in the process. The proportions are usually so chosen that the product contains at least 8 percent by weight free hydroxyl groups.

The polyester so obtained is introduced into the organopolysiloxane solution described above and the mixture is then heated to at least 140° C., preferably, 190 to 230° C., while distilling off the solvent and water. The resin melt is further heated at atmospheric pressure, while passing through nitrogen, until its viscosity, measured at 1750 C., has reached the range of 250 to 5000 cst. The co-condensate thuse prepared is diluted with conventional solvents, such as aromatic hydrocarbons, alcohols, ketones or esters, to the viscosity suitable for the intended application and finally mixed in an edge mill with a heat resistant pigment and, if desired, also with hardening additives customary for siloxane and alkyd resins, for example, with lead, cobalt or zinc naphthenate of with titanic acid esters, to produce a lacquer ready for use.

This lacquer is applied to the substrate to be coated in the usual manner by dipping, spraying or brushing and then baked by heating at temperatures in the range from 200 to 230° C. Coating layers of good surface hardness are thus obtained of the usual hardness scale for lead pencils of H to 2H at room temperature, which are very slightly thermoplastic, corresponding to a decrease in hardness to HB to B at 180° C. When continuously heated at a temperature of 280° C., which is substantially higher than that of older test conditions, cracks, a slight deterioration of gloss and very slight yellowing of the coatings produced according to the present invention there are only to be seen after a long time.

The following examples are given for the purpose of illustrating the present invention, the parts being parts by weight:

EXAMPLE 1

The polyester which is used as a component in the following example and in the following comparative experiments, is obtained by melting together 1164 parts terephthalic acid dimethyl ester, 402 parts trimethylol propane, 640 parts ethylene glycol and 1 part barium stearate and heating this mixture, with stirring, to 220° C. within the course of 6 hours, while 320 parts methanol are distilled off through a column. Nitrogen is subsequently passed through the resin melt at the same temperature for 30 minutes and a polyester with a hydroxyl group content of 15.5 percent by weight and an acid number 0.5 is thus obtained.

To produce a polysiloxane which can be used as the second component according to the present invention, 2540 parts phenyl trichorosilane, 1030 parts dimethyl dichlorosilane and 130 parts trimethyl chlorosilane are dissolved in 3500 parts xylene. The hydrolysis of this chlorosilane mixture and the condensation to form the polysiloxane can be carried out continuously as follows: the chlorosilane solution and water are allowed to run simultaneously into a vessel in which the two liquids are mixed very intensely by means of a stirrer rotating at 200 to 2000 r.p.m. and surrounded by wave breakers. The liquids are added at such a rate that the hydrochloric acid formed by the hydrolysis becomes at most twice normal, that the temperature in the reaction vessel does not rise above 35° C. and that the residence time is, on the average, 5 minutes, whereupon the mixture overflows into a second vessel. In this vessel, sufficient sodium chloride is continuously added, with stirring, for the aqueous phase to contain 5 to 10 percent by weight sodium chloride in order to accelerate the settling of the phases. The mixture is then allowed to flow into a separator from which the xylene solution of the organ-polysiloxane resin which has meanwhile formed in withdrawn. This solution is filtered and 5165 parts with a content of 30 percent by weight siloxane resin are obtained.

388 parts of the polyester described above are stirred at 60° C. into the total amount of this solution and the mixture is heated under atmospheric pressure, while distilling off xylene and water, until it has reached a temperature of 180° C. Nitrogen is then passed through the resin melt and the temperature is increased and finally kept between 200 and 230° C. for about 20 minutes. The resin is then allowed to cool to 140° C., a mixture of 800 parts xylene and 200 parts butanol is added and the solution is filtered and diluted with the same solvent mixture to a content of 50 percent by weight lacquer resin.

EXAMPLE 2

To produce the polysiloxane component, 2540 parts phenyl trichlorosilane, 1030 parts dimethyl dichlorosilane and 174 parts trimethyl chlorosilane are dissolved in 4000 parts xylene, the hydroylsis is carried out as described in Example 1 and 4840 parts of a xylene solution containing 33.7 percent by weight organo-polysiloxane resin are obtained.

From this solution and 408 parts of the polyester employed in Example 1, there is prepared, in the manner there described, an analogous lacquer resin solution containing 50 percent by weight of co-condensate which can be used according to the present invention.

The ageing properties of heated coatings produced with the lacquers described in the examples is compared in the following table with the behaviour of polyester siloxanes of different composition, which were prepared in the following manner:

Comparative experiment A 1590 parts phenyl trichlorosilane, 645 parts dimethyl dichlorosilane and 190 parts diphenyl dichlorosilane were dissolved in 2500 parts xylene and further treated by a process analogous to that used in Example 1. There were obtained 3750 parts of a xylene solution containing 34 percent by weight organo-polysiloxane resin. 319 parts of the polyester used in Example 1 were stirred at 60 to 70° C. into this solution which was then co-condensed and diluted by the method there described.

Comparative experiment B 1590 parts phenyl trichlorosilane and 645 parts dimethyl dichlorosilane were dissolved in 2500 parts xylene and further treated by a process analogous to that used in Example 1. There were obtained 2940 parts of a xylene solution containing 34.5 percent by weight organo-polysiloxane resin. 253 parts of the polyester used in Example 1 were stirred at 60° C. into this solution and the lacquer resin solution was finished by a method analogous to that previously described.

Comparative experiment C 46 parts ethanol were added dropwise with stirring to a solution of 635 parts phenyl trichlorosilane in 1000 parts xylene, the solution was then further stirred for 30 minutes, 258 parts dimethyl dichlorosilane were subsequently added and the mixture was then subjected to hydrolysis with water, as described in Example 1 for the organo-chlorosilane solution. There were obtained 1268 parts of a solution containing 37.5 percent by weight organo-polysiloxane resin, into which 119 parts of the polyester used in Example 1 were stirred. The process was further carried out in a manner analogous to that described in the Examples.

Comparative experiment D

In accordance with the method disclosed in British patent specification No. 761,370, a mixture of 114 parts phenyl trichlorosilane, 209 parts methyl trichlorosilane, 253 parts diphenyl dichlorosilane and 129 parts dimethyl dichlorosilane was added dropwise, with stirring, to a mixture of 150 parts butanol, 1250 parts butyl acetate and 1400 parts water. After the aqueous phase had settled and had been separated, there were obtained 1080 parts of a solution of 30 percent by weight organo-polysiloxane resin in butyl acetate and butanol, which was washed until free from acid and then mixed with 109 parts of the polyester used in Example 1. The mixture was first heated to 160° C., while distilling off the solvents, and the residue was further heated to 200° C., while reducing the pressure to 20 to 40 mm. Hg, and kept at this temperature for about 2 hours. After cooling, the co-condensate so obtained was dissolved in the same amount by weight of a mixture consisting of 80 percent by weight xylene and 20 percent by weight butanol.

For testing, 100 parts of each of the lacquer resin solutions prepared according to Examples 1 and 2 and in the comparative experiments A to D, each of which contained 50 percent by weight of non-volatile material, were ground on an edge-runner with 50 parts rutile pigment, diluted with the xylene-butanol mixture previously used to the consistency suitable for a spray gun and mixed with 0.5 part lead naphthenate and 0.5 part butyl titanate. Metal sheets were spray-coated with the white lacquer enamels thus prepared, the coating layers baked at 230° C. for one hour and then heated at 280° C. and observed until cracks appeared in the coatings of 50 to 60 micron thickness. The following table summarizes the periods of time from the start of the ageing test until cracks were formed, the gloss values after 10, 50, 100 and, unless cracks had previously appeared, 375 hours, measured on an empirical comparative scale where the figure 0 means maximum high gloss and the figure 4 means a completely dull surface, and, finally, the yellowing occurring at the same time, again in an empirical evaluation where the figure 0 means a pure white surface and the figure 4 means a strong brown colouring.

As can be seen from the table, the control coatings are inferior to those obtained according to the present invention either in respect of gloss retention and the white colour (A) or in respect of the stability of the coating layers (B, C, D).

What we claim is:

1. A polyester-polysiloxane co-condensate reaction product, wherein the polyester is produced by the condensation of about 25 to 35 mol percent terephthalic or isophthalic ester, about 10 to 20 mol percent trimethylol propane, and about 45 to 60 mol percent ethylene glycol, which polyester has hydroxyl content of about 8 to 20 wt. percent, and wherein the polysiloxane is produced by water hydrolysis of a solution of 55 to 65 mol percent phenyl trichlorosilane, 35 to 45 mol percent dimethyl dichlorosilane, and 5 to 10 mol percent trimethyl chlorosilane in solution in a solvent which is substantially inert and substantially immiscible with water, said polysiloxane being present in proportion of about 3 to 5 times the amount by weight of said polyester.

2. A baking enamel lacquer comprising the polyester-polysiloxane co-condensate as claimed in claim 1.

3. The polyester siloxane co-condensate claimed in claim 1, having a viscosity of about 250 to 5,000 centistokes at 175° C.

TABLE

| | Hours up to crack formation | Gloss after— | | | | Yellowing after— | | | |
|---|---|---|---|---|---|---|---|---|---|
| | | 10 hrs. | 50 hrs. | 100 hrs. | 375 hrs. | 10 hrs. | 50 hrs. | 100 hrs. | 375 hrs. |
| Example 1 | 375 | 0.2 | 0.3 | 0.3 | 0.3 | 1.8 | 1.9 | 2.2 | 2.0 |
| Example 2 | 375 | 0.5 | 0.6 | 0.6 | 0.7 | 1.8 | 1.8 | 1.8 | 2.3 |
| Control A | 375 | 0.6 | 1.0 | 1.1 | 1.1 | 1.8 | 2.4 | 2.4 | 2.5 |
| Control B | 250 | 0.1 | 0.2 | 0.2 | | 2.1 | 2.3 | 2.3 | |
| Control C | 200 | 0.7 | 1.2 | 1.7 | | 2.2 | 2.5 | 2.6 | |
| Control D | 140 | 0.6 | 0.8 | 1.2 | | 2.0 | 2.5 | 2.9 | |

References Cited

UNITED STATES PATENTS 2,821,518   1/1958   Edelman _____ 260—824
3,044,979   7/1962   Saville _____ 260—824
3,044,980   7/1962   Modic _____ 260—824

FOREIGN PATENTS 629,289   10/1961   Canada.
651,101   10/1962   Canada.
663,903    5/1963   Canada.

SAMUEL H. BLECH, *Primary Examiner.*

P. LIEBERMAN, *Assistant Examiner.*

U.S. Cl. X.R.

260—31.2, 32.8, 33.4, 33.6, 40, 46.5